(12) United States Patent
Dahlerud et al.

(10) Patent No.: US 6,266,201 B1
(45) Date of Patent: Jul. 24, 2001

(54) MULTIPLE CHANNEL REWRITE SYSTEM

(75) Inventors: Ole Christian Dahlerud; Rolf Jahren; Arne Adli, all of Oslo (NO)

(73) Assignee: Tandberg Data Asa, Oslo (NO)

( * ) Notice: Subject to any disclaimer, the term of this patent is extended or adjusted under 35 U.S.C. 154(b) by 0 days.

(21) Appl. No.: 09/136,679

(22) Filed: Aug. 19, 1998

(51) Int. Cl.$^7$ .................................................. G11B 5/09
(52) U.S. Cl. ............................... 360/53; 360/31; 360/48; 360/54; 714/701; 714/798; 714/799
(58) Field of Search ............................... 360/31, 48, 53, 360/54; 714/701, 798, 799

(56) References Cited

U.S. PATENT DOCUMENTS

| | | | |
|---|---|---|---|
| 3,654,624 | 4/1972 | Becker et al. | 365/127 |
| 4,142,209 | 2/1979 | Hedlund et al. | 386/95 |
| 4,229,808 | 10/1980 | Hui | 360/48 |
| 4,308,557 | 12/1981 | Dietrich | 369/53 |
| 4,488,278 | 12/1984 | Dieterich | 369/50 |
| 4,534,031 | 8/1985 | Jewer | 369/93 |
| 4,542,288 | 9/1985 | Drexler | 235/487 |
| 4,544,835 | 10/1985 | Drexler | 235/487 |
| 4,571,716 | 2/1986 | Szerlip | 369/54 |
| 4,598,196 | 7/1986 | Pierce et al. | 235/454 |
| 4,634,850 | 1/1987 | Pierce et al. | 369/44.26 |
| 4,652,730 | 3/1987 | Marshall | 369/47 |
| 4,692,603 | 9/1987 | Brass et al. | 235/454 |
| 4,730,293 | 3/1988 | Pierce et al. | 369/122 |
| 4,910,725 | 3/1990 | Drexler et al. | 369/59 |
| 5,841,600 | * 11/1998 | Kaplan | 360/48 |
| 5,995,306 | * 11/1999 | Contreras et al. | 360/53 |

* cited by examiner

*Primary Examiner*—W. Chris Kim
*Assistant Examiner*—Regina Y. Neal
(74) *Attorney, Agent, or Firm*—Schiff Hardin & Waite

(57) ABSTRACT

In a data recording system utilizing multiple channels and data blocks wherein the data blocks are read subsequent to being written so as to check for errors, the data blocks are rewritten according to a method to provide for rewriting only the defective data blocks. The blocks may be rewritten on other than their original channels. Channels for rewriting are determined by selecting a channel with a highest current block number so that data is rewritten in a channel which has been able to write and verify the most of its original blocks. Error checking is continued in a channel even after finding of an error in that channel. Data blocks of the frames may be skewed between the channels at a beginning of the frame. A ring counter output is applied to break a deadlock where a block is continously rewritten on a failing channel.

8 Claims, 3 Drawing Sheets

| | | | | | | | | | | | | |
|---|---|---|---|---|---|---|---|---|---|---|---|---|
| CH0 | A0 | D1 | C2 | B3 | D4 | C5 | B6 | A7 | A8 | D9 | C10 | ... | A127 | A0 |
| CH1 | B0 | A1 | D2 | C3 | A4 | D5 | C6 | B7 | B8 | A9 | A10 | ... | B127 | B0 |
| CH2 | C0 | B1 | A2 | D3 | B4 | A5 | D6 | D4 | C7 | C8 | B9 | ... | C126 | C127 |
| CH3 | D0 | C1 | B2 | A3 | C4 | C2 | B5 | A6 | D7 | D8 | C9 | ... | D126 | D127 |

| | | | | | | | | | |
|---|---|---|---|---|---|---|---|---|---|
| CH0 | A0 | D1 | C2 | B3 | D4 | C5 | D0 | B6 | A7 | A8 | A3 | ... |
| CH1 | B0 | A1 | D2 | C3 | A4 | B2 | D5 | C6 | B7 | B4 | B8 | ... |
| CH2 | C0 | B1 | A2 | D3 | C1 | B4 | A5 | D6 | C4 | C7 | C8 | ... |
| CH3 | D0 | C1 | B2 | A3 | A3 | C4 | B5 | A3 | A6 | D7 | D8 | ... |

Fig. 3a

| | | | | | | | | | |
|---|---|---|---|---|---|---|---|---|---|
| CH0 | ... | B126 | A127 | A0 | A123 | D1 | C2 | B3 | A126 | D4 |
| CH1 | ... | C126 | B127 | B125 | B0 | A1 | D2 | B3 | D0 | C3 | A4 |
| CH2 | ... | D126 | C124 | C127 | C0 | B1 | D127 | A2 | A126 | D3 | B4 |
| CH3 | ... | A123 | D126 | D127 | D0 | A126 | C1 | B2 | C1 | A3 | C1 |

Fig. 3b

| RCN T | 0 | 1 | 2 | 3 | 4 | 5 | 6 | 7 | 8 | 0 | 1 | 2 | 3 | 4 |
|---|---|---|---|---|---|---|---|---|---|---|---|---|---|---|
| CH0 | A0 | D1 | C2 | B3 | D4 | A2 | C5 | D4 | B6 | A7 | A8 | D9 | C10 | B11 |
| CH1 | B0 | A1 | D2 | C3 | A4 | D5 | C6 | A4 | B7 | B8 | A9 | D10 | C11 | A12 |
| CH2 | C0 | B1 | A2 | D3 | B4 | A5 | D6 | C7 | C8 | B9 | A10 | D11 | B12 | A13 |
| CH3 | D0 | C1 | B2 | A3 | C4 | C2 | B5 | A6 | D7 | D8 | C9 | B10 | A11 | C12 |

Fig. 4

| RCN T | 0 | 1 | 2 | 3 | 4 | 5 | 6 | 7 | 8 | 0 | 1 | 2 | 3 | 4 |
|---|---|---|---|---|---|---|---|---|---|---|---|---|---|---|
| CH0 | A0 | D1 | C2 | B3 | D4 | C2 | C5 | B6 | A7 | A8 | D9 | C10 | B11 | D12 |
| CH1 | B0 | A1 | D2 | C3 | A4 | D2 | D5 | C6 | B7 | B8 | A9 | D10 | C11 | A12 |
| CH2 | C0 | B1 | A2 | D3 | B4 | A2 | A5 | D6 | C7 | C8 | B9 | A10 | D11 | B12 |
| CH3 | D0 | C1 | B2 | A3 | C4 | C2 | B5 | A6 | D7 | D8 | C9 | B10 | A11 | C12 |

Fig. 5

MULTIPLE CHANNEL REWRITE SYSTEM

BACKGROUND OF THE INVENTION

1. Field of the Invention

The present invention relates generally to a method for re-writing data in a multiple channel data writing apparatus, such as a multiple channel tape drive.

2. Description of the Related Art

Tape drives are used in data systems for recording data, and many of the current tape drives are multiple track tape drives having a plurality of parallel tracks running length wise along the tape.

Tape drives currently in use read the data after performing the write operation to verify that the data which has been written is correct. Error checking and correction (ECC) procedures are followed to assure that the data which was written correctly can be also read and so check if errors occur after the time of writing of the data.

To allow for error checking and correction, data is grouped into data frames. The data frames include a number of tape blocks used for user data, the tape blocks being lengths of tape in which the data is written. The data frames also include a number of error checking and correction blocks that give the redundancy needed to correct any blocks which are determined to have errors during the read operation.

Some tape drives write data to several tracks on the tape simultaneously. The tracks are in parallel running along the length of the tape. To allow for simultaneous read and write operations, the data on each separate track has to be synchronized with data on other tracks within certain limits. Typically, the frames are started simultaneously on all of the tracks. This means that if one electrical write channel corresponding to one track on the tape has to perform rewrite operations, the other channels will have to write padding blocks in the frame to keep the frame synchronization between all of the tracks. This is normally done at the end of each frame allowing for a certain skew within the frames.

The electrical channels write data from one data buffer onto a corresponding track of the tape. All of the data blocks on a given track of the tape thus have been read from corresponding data buffer, passed through a corresponding electrical channel and to a write head of that channel. Data from other tracks along the tape are read from other corresponding data buffers and passed through other channels to other write heads. The read heads and the channels for them likewise correspond to the tape tracks.

Due to the nature of the read/write head contact with the tape and to the distribution of the defects on the tape itself, it is likely that one channel will face more defects and have more rewritten blocks than other channels. This causes a loss in the capacity of the tape which is greater than the corresponding number of blocks actually rewritten. For example, in an eight track tape drive, if one channel has to rewrite four blocks and the other channels have no rewrites, then the other channels will have to write four padding blocks at the end of each frame. The total loss in capacity as the result of these four errors is a loss of eight times the number of rewritten blocks, or 32 blocks.

In practice, the situation is even worse. The normally used rewrite sequence will rewrite all blocks in a channel after the first detected bad block in that channel. If a block n is bad when it is written, it will typically be detected later when a block n+2 has been written. This is due to the distance between the write gap and the read gap in the read/write head. When the rewrite operation is started, the block n will be rewritten as well as the blocks n+1 and n+2 since those blocks were not verified by the read operation before the rewrite sequence was started. An example is shown in FIG. 1 wherein three single block defects in a four track tape caused a loss of capacity of 36 blocks. The capacity loss is increased the greater the number of tracks in the tape.

Referring to FIG. 1, a four track tape is illustrated schematically having four channels ch0, ch1, ch2 and ch3. The illustrated data frame is eight blocks long, in other words, eight data blocks are to be successfully written in each channel to complete the frame. Data is written by a write gap of a read/write head of the tape drive and is read by the read gap of the read/write head for verification. The write and read gaps are spaced from one another. For purposes of the present example, the space corresponds to the length of two data blocks on the tape.

At the beginning of the frame, data blocks a0, b0, c0 and d0 corresponding to the four tracks a, b, c and d are written simultaneously by the write heads (the write gap of the read/write head), as shown in the first column. Next on the tape, the data blocks a1–d1 are written in their respective tracks by the channels, as indicated in the following column. The known data writing scheme thus writes data from a given channel onto a corresponding track of the tape. In other words, the channel ch0 writes the data into the track a, channel ch1 writes the data to track b, channel ch2 writes track c with data, etc.

A third writing operation writes the data blocks a2–d2 in the next column along the tape. In the illustrated example, the data block a2 in channel ch0 includes an error, as indicated by a heavy outline in the drawing. Since the read gap of the read/write head follows the write gap and has not yet reached the data blocks a2–d2, the error in the data block a2 remains undetected. Next, the data blocks a3–d3 are written, followed by the data blocks a4–d4 in their respective channels. At this time, the read gap, which has read and verified the data blocks a0–d0 and a1–c1, reaches the data blocks a2–d2. Upon reading this column of data blocks, the verification software determines that the data block a2 includes an error. To correct the error, when the following column of data blocks are written the data a2 is rewritten in the channel ch0, as indicated by the double outline, while the remaining channels are written with the data blocks b5–d5 for their corresponding tracks.

Since error checking is performed by channel, the known system halts error checking in a channel when an error is found in that channel and only starts checking for errors again when the original error has been corrected. In a following column of data blocks in FIG. 1, the data block a3 is written by the channel ch0 since the data block a3 had not previously been error checked and verified. The data block a3 however includes an as-yet undetected error when it is written a second time, as indicated in heavy outline, and so must eventually be corrected. The next column of data blocks includes the data block a4 which had also not been verified due to halting of the error checking in channel ch0 upon discovery of the error in original block a2. The data blocks b7–d7 are written as well in that column. Next, the data block a5 is written by the first channel ch0 and since the remaining channels ch1–ch3 have completed the data frame of eight blocks in each of their respective tracks, a padding block is written by the channels ch1–ch3. For purposes of illustration, the padding block are marked by hatching and are shown as duplicates of the data block last written in each corresponding channel, the data blocks b7–d7.

The read head reads the second writing of the block a2 as the block a5 is being written and verifies that this second attempt at writing the data of block a2 is correct. The read head then reaches the block a3 and determines that the second writing of the data block a3 includes an error, causing the write head to rewrite the data block a3 by the channel ch0, as indicated by double outline, while write heads for the other channels continuing to write padding blocks, marked by diagonal lines, in the remaining three tracks. In the next write operation, the data block a4 is written a third time by channel ch0, but it contains an as-yet undetected error. Padding blocks continue to be written by the remaining channels. The corrected data block a4 is not rewritten by the channel ch0 until the sixth group of padding blocks are written by the channels ch1–ch3. After rewriting the block a4 a fourth time, it is error free.

Writing of the data blocks continues to the end of the frame. The frame is finished by the writing of a data block a7 by the channel ch0. The next frame is started after the end of the illustrated frame. Since the start of the next frame must not be skewed across the tracks, 36 padding blocks were written by channels which had no errors. Six extra blocks were written by channel ch0 besides the three which were in error. All of these extra data blocks and padding blocks occupy space on the tape. Thus, a considerable amount of tape space is consumed for error correction of only three errors.

SUMMARY OF THE INVENTION

The present invention eliminates synchronization capacity loss in a multiple channel data recording device. The present invention also minimizes rewrite capacity loss so that only defective data blocks are rewritten. In addition, a channel which becomes defective either due to hardware problems or a tape track that is defective due to a bad section of the tape will not be permanently eliminated but will immediately be redetected and used for data storage when the channel or track is error free.

These and other advantages of the invention are provided by a method for rewriting blocks of data in which errors are detected and blocks are rewritten to correct the errors without requiring that the rewrite operation be performed by the original channel or on the original track for the block. Blocks of data of a particular track are not restricted to being written on by an assigned channel but are written instead by a preferred channel. The writing operation cycles the channels of data across the different tracks of the tape, as well.

Only blocks which are determined to be bad are rewritten. Error checking continues on a channel for each data block even after detection of an error in that channel. The rewriting of blocks is preferably done by the channel that has been able to write and verify most of its original blocks. Thus, correction is accomplished by rewriting to the channel with the best chance of writing the data correctly.

Frames, specifically the beginning and end of a frame, need not be synchronized between the channels but are allowed to skew. The skew may be up to a maximum of, for example, half a frame. The blocks from all of the channels are handled equally during the reading operation.

These and other features and advantages of the invention will become apparent after review of the drawings and detailed description.

BRIEF DESCRIPTION OF THE DRAWINGS

FIG. 1 is a schematic diagram of a frame of a four channel data recording system showing data blocks in a frame and error correction according to the prior art;

FIG. 2 is a schematic illustration of a frame of a four channel data recording system utilizing an error correction method according to the present invention;

FIGS. 3a and 3b are schematic illustrations of the four channel data recording arrangement illustrating error correction of a continuous failure in one channel by the present method, FIG. 3a illustrating the beginning of the frame and FIG. 3b illustrating the skew at the end of the frame;

FIG. 4 is a four channel recording arrangement showing failure of data blocks in multiple channels simultaneously which is corrected according to the present method; and FIG. 5 is a schematic diagram a four channel recording arrangement in which all four channels fail simultaneously and are corrected by the present method.

DETAILED DESCRIPTION OF THE PREFERRED EMBODIMENTS

Figures 1, 2:
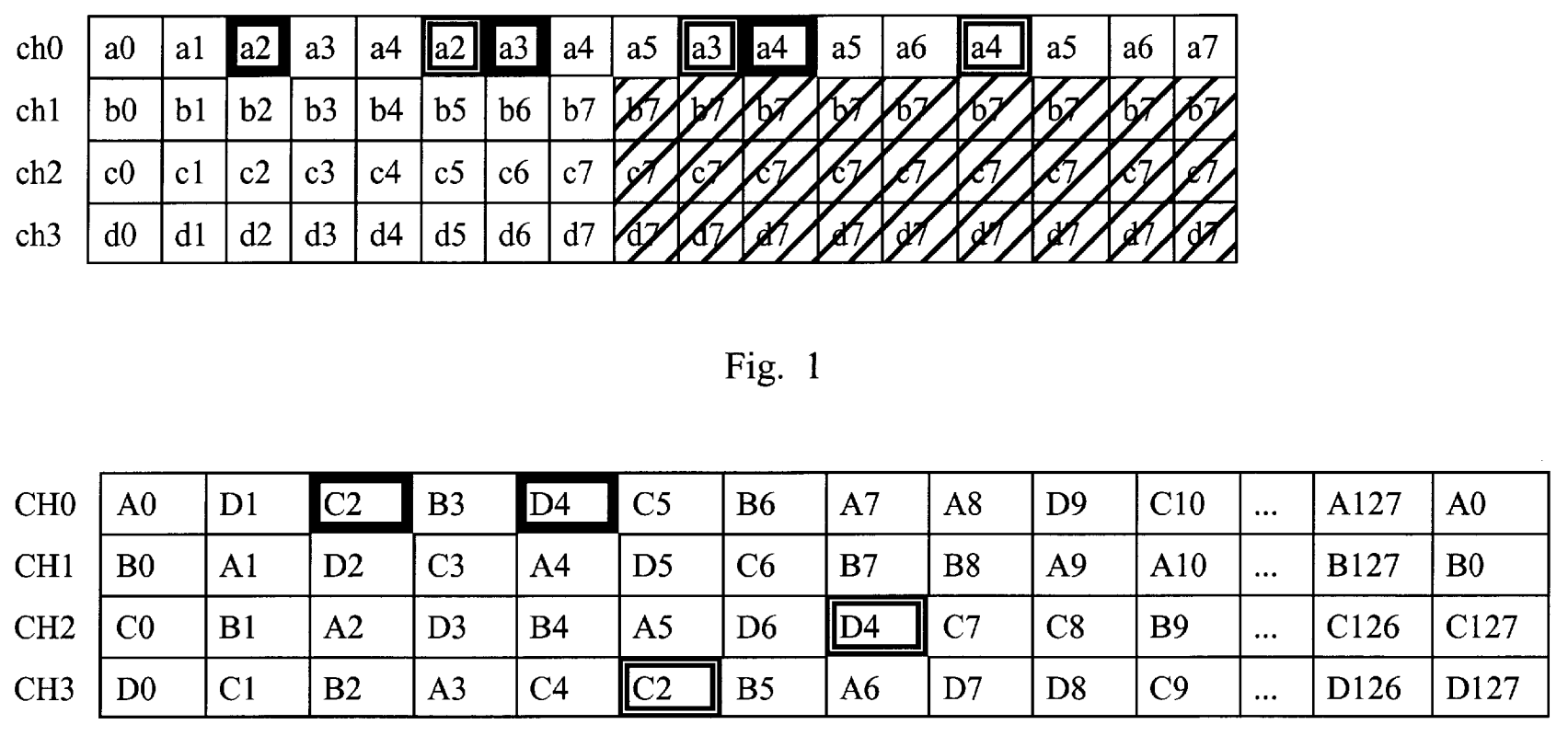

FIG. 2 illustrates the method of the present invention as applied in a four channel recording arrangement. The recording apparatus is, in one example, an electromagnetic tape recording device. Although four channels are shown, the tape device may have eight channels, sixteen channels, or some other number. When one of the four channels fails, the block from that channel is rewritten on a channel having the highest current block number. The current block number is the number of the block which the channel intends to write if it is not a target for a rewrite block. This will cause the attempted rewrite of the failed block to be performed on the channel which has written the most blocks successfully and so gives the other channels a chance to catch up. If more than one channel has the same current block number, the channels for rewriting are selected in decreasing order from the highest to the lowest channel. Alternately, the rewriting may be in increasing order as a tie breaker.

In FIG. 2, the data blocks of a tape track are shifted, or cycled, from channel to channel at each sequential column, in other words, at each subsequent write operation. The data block A0 is written by channel CH0 in the first column of the frame but is shifted by one to channel CH1 for the writing of block A1. The shifting continues in this manner until an error is found aid requires correction by a rewrite operation. The cycling of the blocks around the channels provides better ECC performance. If one channel is bad during the read operation under the prior format, it is likely that one ECC interleave is corrupted because all the blocks belonging to one interleave is written on the same channel. By spreading the interleaves over all four channels, the chance that a correctable frame is available if one channel is bad for some blocks is significantly increased. This represents an improvement in the write process, which alone provides an improvement in performance. However, when used in combination with the rewrite process as described hereinafter, provides an even greater performance enhancement.

The cycling of the tracks in a four channel system is performed according to the following:

|N|N+3|N+2|N+1|N+3|N+2|N+1|N|

This pattern is repeated every $8^{th}$ block. The first channel CH0 first writes block A0 to track A, then the channel source is shifted offset by 3, in other words, it writes data block D1 to track A.

The cycling is accomplished by cycling the addresses of the blocks in the data buffers for the channels, causing the channels to read from a different data buffer for each new block that is written to the tape. As a result, a given channel cycles what block is read from the data buffer for the write operation. The cycling operation is also implemented in the read operation from the tape so that the reading of the tape tracks results in the appropriate data being written back, or restored, to the respective data buffers.

In the illustration of FIG. 2, the block C2 is discovered to contain an error, as indicated by heavy outline, by the read head gap and so is rewritten, as indicated by double outline, following the block C4 by channel CH3. This delay in rewriting is due to the spacing between the write gap and the read gap in the read/write head, as explained above. Channel CH3 is selected since channels CH0, CH1, CH2 and CH3 are all equally high channel numbers but channel CH3 is the highest channel number and so is selected according to the rule of the present example.

The present method keeps track of which blocks have been written but not yet verified. Verification continues in a channel after an error is discovered in that channel. When a block is determined to be incorrect, the system only has to rewrite that particular bad block, instead of rewriting the bad block and the two blocks that follow it. When rewriting a block, the channel continues to verify those blocks that are in the queue. The reading of the blocks for errors in the channel thus continues after the discovery of the error in block C2 and so block B3 is checked, is discovered to be error-free and is not rewritten.

When the block D4 is read, it is discovered to also contain an error. During the rewrite operation for block D4, the channel CH3 no longer has a highest current block number; only channels CH0, CH1 and CH2 are that the highest current block number. Channel CH2 is selected as the highest channel number with the highest current block number and so the data block D4 is rewritten in channel CH2.

The writing of the data continues until 128 data blocks are written in each channel in the current frame. One frame consists of 128 data blocks (0 to 127) per channel in the present example. In the next to last column of data blocks, the final data block of the frame is written by channel CH0 and by channel CH1, namely data blocks A127 and B127. Since data blocks were rewritten within the frame in the channels CH2 and CH3 and so shifting the end of the frame by one block for these channels, the data blocks D126 and A126 are written in those channels, respectively.

In the final column of FIG. 2, the next frame is started in channels CH0 and CH1 while the preceding frame is finished by the writing of the data blocks C127 and D127 in channels CH2 and CH3, respectively. The frame ending is thereby skewed by one data block across the columns, which is acceptable according to the present invention.

The present method thus results in only two additional data blocks being used to correct two errors as compared to an error free frame. No padding blocks are used in this example and no channel is askew by more than one block from the others at the end of the frame and the beginning of the next frame.

Referring to FIGS. 3a and 3b, a four channel recording is shown in which the channel CH3 is continuously failing. The failed data is indicated by heavy outline. After the detection of the error data block D0 as shown in FIG. 3a, the data block D0 is rewritten in channel CH3, the highest channel number, while channels CH0, CH1 and CH2 write data blocks B3, C3 and D3. The rewriting is indicate by double outline. Since channel CH3 is no longer at the highest current data block, the following column rewrites the data blocks C1 in channel CH2, as indicated by the double outline. In the following column, the data block B2 is rewritten in channel CH1. By this time, the data block D0 is discovered to have been erroneously written in channel CH3 again, shown by the heavy outline and double outline, and is rewritten once more in channel CH0. This continues until the end of the frame as shown in FIG. 3b which ends when all of the data blocks of the frame A127, B127, C127 and D127 have been written.

Due to the continuing failure of the channel CH3, the end of the frame is skewed, as illustrated in FIG. 3b, but only by a limited number of columns. The next frame starts when at least one of the data block: A0, B0, C0 and D0 is written. The frame end is thus not synchronized across all channels in this example. Specifically, the penultimate block 126 is written in the first illustrated column, except for data block A123, which has been rewritten from a previous failure. In the next column, the last block of the frame is written for blocks A127 and B127, a written block C124 is written in channel CH2, and block D126 is written in channel CH3. The next frame starts with the writing of A0 in channel CH0. Data checking and rewriting continue until the last corrected data block of the frame is rewritten as A126 in channel CH0.

This cycling of the rewriting operation through the channels continuously retests each error-prone channel for error-free writing so that if the channel is capable of again writing data correctly it is immediately used. Space which would have been lost by removing the channel from service is thus available.

The method set forth so far for rewriting data for a single channel failure may cause bad data blocks to be stuck in a deadlock to or more channels are continously failing. Some blocks may then be rewritten on a failing channel over and over again. According to the present invention, the present method provides that if two or three of the channels fail simultaneously, the bad data blocks are rewritten on random channels. Rewriting of data blocks according to the following example utilizes a counter for continuously counting from 0 to 8. Such a counter is referred to as a ring counter RCNT. Other random generators may be used instead.

The block from the highest channel that contains an error finds the channel with the highest current block number. A modulo 2-RCNT, or binary ring counter, output signal is then added to the channel number to determine which channel to rewrite the data block on. Simultaneously, the block from the second and third highest failed channels checks to see if there is more channels with a highest current block number or else finds a channel with a second or third highest current block number. Then the binary ring counter output is added to this channel number to determine which channel is targeted for the rewrite operation.

This multiple channel failure is illustrated in FIG. 4 wherein the write operation of data blocks C2 and A2 resulted in erroneous data, as indicated in heavy outline. The data blocks D4 and A4 are also failed write operations. In this example, the output of the ring counter RCNT is shown at the top row of the table. When the ring counter reaches 5, the erroneous data blocks C2 and A2 are rewritten, the data block C2 being rewritten in channel CH3 and the data block A2 being rewritten in channel CH2. After determining that the data blocks D4 and A4 contain errors, these data blocks are rewritten in channels CH0 and CH1, respectively. Thus, the chance of a systematic deadlock for blocks in a continously failing channel is removed.

If all four channels (in a four channel system) of the data recording system fail simultaneously, the blocks will be rewritten in their respective channels. As shown in FIG. 5, the errors in the data blocks C2, D2, A2 and B2 are discovered after the writing of the data blocks D4, A4, B4 and C4. Thus, according to this rule these data blocks are rewritten in the following column in their original order. Thereafter, the writing of the data blocks continues in the next column according to the normal write operation.

Thus, there has been shown and described a method of writing and rewriting data in a data recording system that results in error correction with use of minimal additional space on the recording medium.

Although other modifications and changes may be suggested by those skilled in the art, it is the intention of the inventor to embody within the patent warranted hereon all changes and modifications as reasonably and properly come within the scope of their contribution to the art.

What is claimed is:

1. A method for rewriting data in a multiple channel recording apparatus, comprising the steps of:

writing data in blocks in multiple channels of the recording apparatus;

performing an error check on data that has been written in said writing step to determine if any block of the data includes an error;

identifying at least one erroneous block of data having at least one error, said at least one erroneous block being in at least one channel of said multiple channels, identifying a rewrite channel of the multiple channels into which to rewrite a block of data corresponding to said at least one erroneous block, said rewrite channel being selected from all of said multiple channels on a basis of a selection protocol; and rewriting the data of said at least one erroneous block in said rewrite channel, wherein said selection protocol used in said identifying a rewrite channel step includes identifying a channel of said multiple channels having a highest current block number of blocks by sequential block number per channel; and wherein said step of rewriting the data rewrites the data in said channel having the highest current block number.

2. A method of rewriting data in a multiple channel recording apparatus, comprising the steps of:

providing data frames in each channel of said multiple channel recording apparatus, each of said data frames being divided into a plurality of sequential blocks to which data is written;

writing the data to said sequential blocks in said data frames, said step of writing the data writing data to each of said multiple channels simultaneously;

reading the data in said sequential blocks subsequent to said writing step;

performing an error check on the data read in said reading step to identify an error block of said sequential blocks having erroneous data upon reading;

selecting a rewrite channel from said multiple channel recording apparatus to which to rewrite data corresponding to said error block, said selecting step including identifying a channel of said multiple channel recording device having a highest sequence number for a next one of said sequential blocks to be written in said writing step; and rewriting correct data corresponding to said erroneous block to a next one of said sequential blocks in said rewrite channel identified in said selecting step.

3. A method as claimed in claim 2, wherein said step of performing the error checking identifies a plurality of simultaneously written erroneous blocks in a corresponding plurality of said channels having erroneous data, and said step of selecting the rewrite channel selects a corresponding plurality of said channels into which data corresponding to said plurality of simultaneously written erroneous blocks are simultaneously rewritten.

4. A method as claimed in claim 2, wherein said step of selecting the rewrite channel identifies at least two of said channels having a highest sequence number, and further comprising the step of:

selecting the rewrite channel from said at least two channels.

5. A method as claimed in claim 4, wherein said selecting the rewrite channel from said at least two channels includes:

generating a random value;

using said random value to determine which of said at least two tracks is selected.

6. A method as claimed in claim 4, wherein said selecting the rewrite channel from said at least two channels includes:

repeatedly counting to a predetermined number;

adding an output of said repeatedly counting step to a channel number of a target channel to determine the rewrite channel.

7. A method for rewriting data in a recording device, comprising the steps of:

providing a tape recording device having a predetermined number of channels for recording data on a tape, said channels running substantially parallel along a length of the tape;

dividing each of said channels into frames along a length of the tape;

providing a plurality of data blocks in each of said frames;

recording data to said data blocks generally in sequence along a length of the tape, said data blocks being recorded generally simultaneously in a plurality of said channels;

reading the data from the data blocks a distance from a writing location on the tape;

performing an error check on the data read in said reading step to identify data blocks containing errors upon reading;

selecting a channel to which to rewrite the data of the data blocks containing errors, said selecting step including determining a channel having a highest current block number; and rewriting correct data corresponding to the data block containing the error to the channel selected in said selecting step.

8. A method as claimed in claim 7, wherein said selecting step further comprises selecting a plurality of data channels for receiving rewriting of correct data when said error checking determines that a plurality of data blocks contain error, said selecting a plurality of data blocks including adding a ring counter output to a channel number of each data block having an error to determine a target channel for rewriting the correct data.

* * * * *